Dec. 11, 1951     I. C. MACDOUGALL     2,577,786
CARBON BISULFIDE RETORT
Filed May 18, 1950     2 SHEETS—SHEET 1
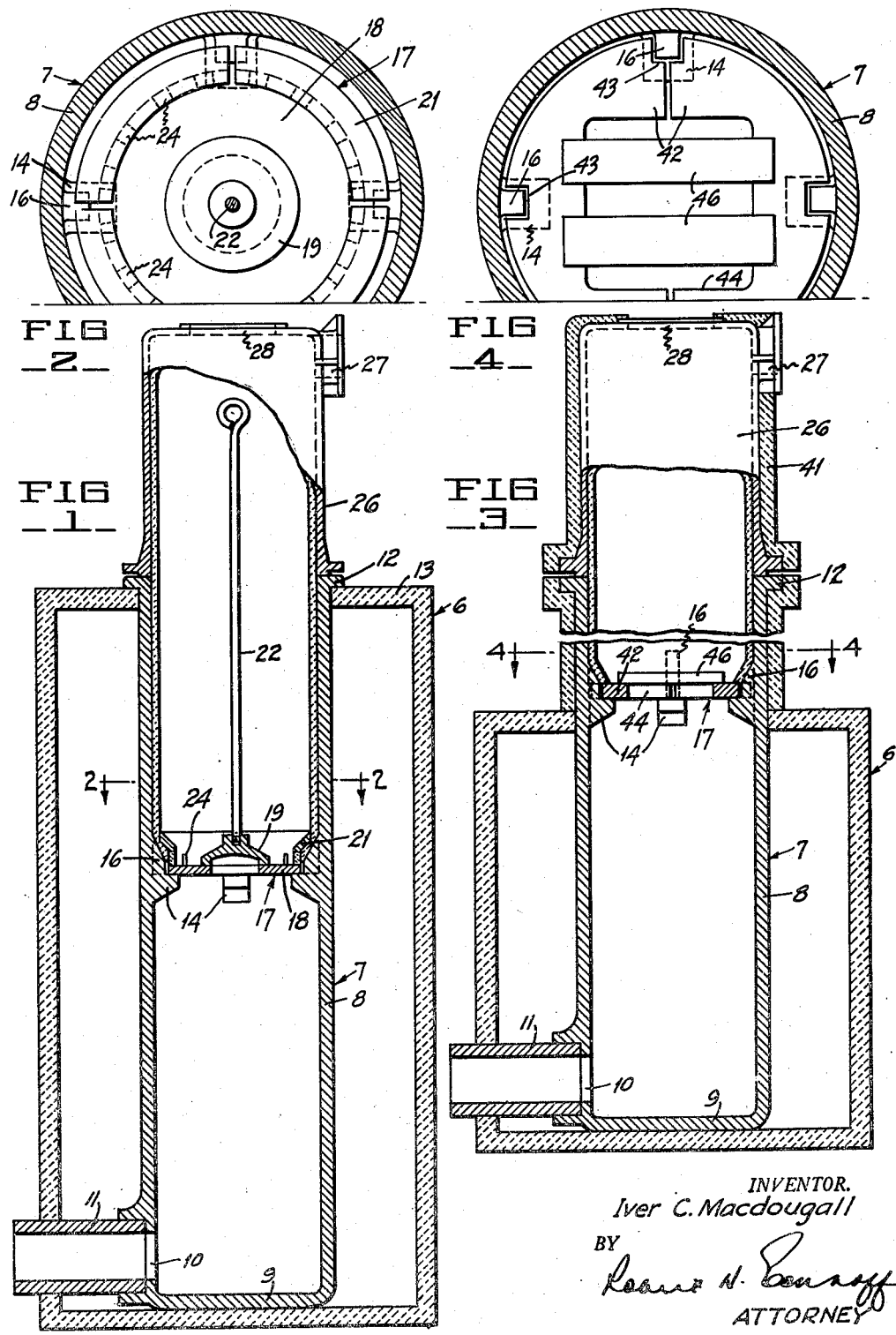
INVENTOR.
Iver C. Macdougall
BY
ATTORNEY

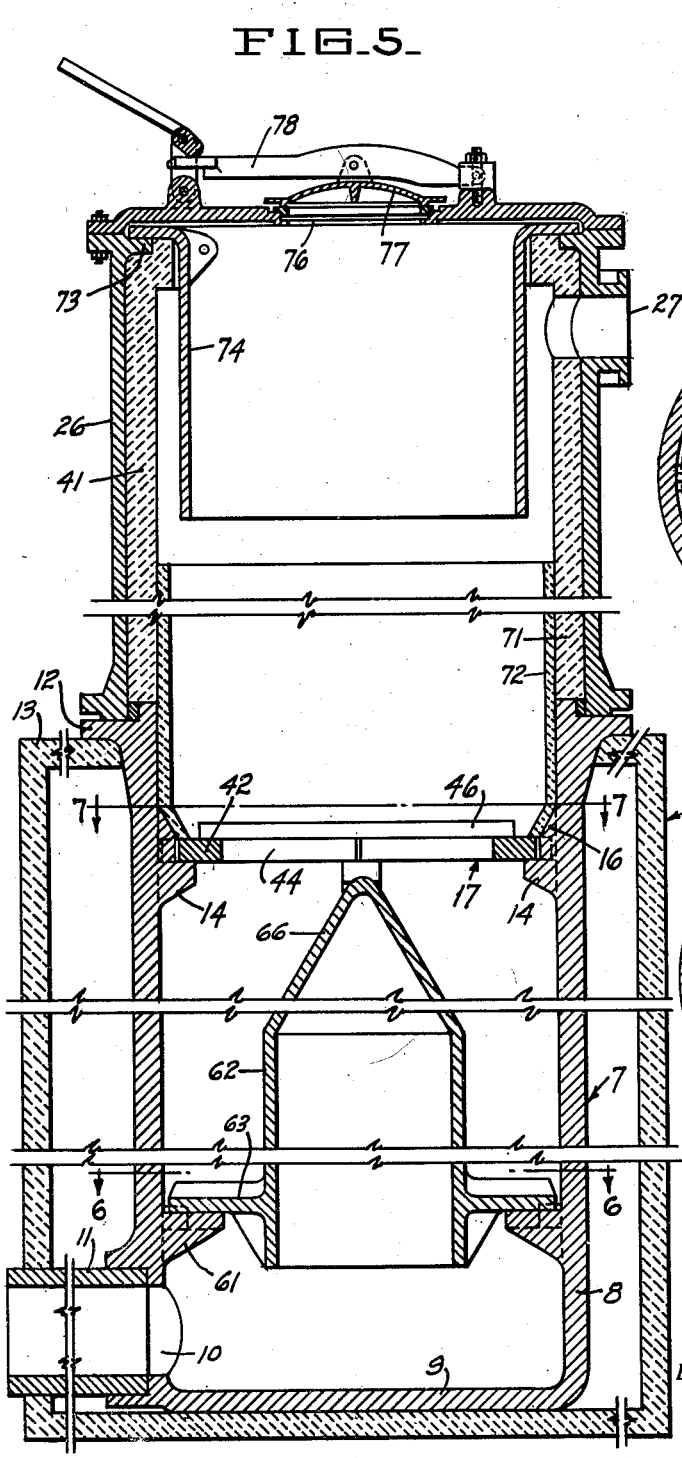
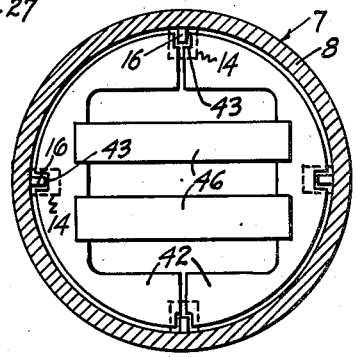
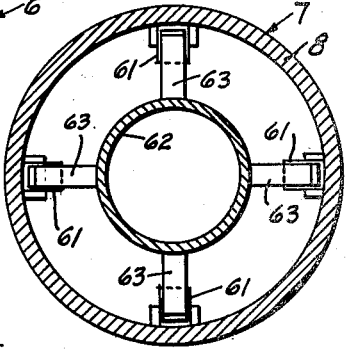
INVENTOR.
Iver C. Macdougall

Patented Dec. 11, 1951

2,577,786

UNITED STATES PATENT OFFICE 2,577,786

CARBON BISULFIDE RETORT

Iver C. Macdougall, Bronxville, N. Y., assignor to Stauffer Chemical Company, a corporation of California Application May 18, 1950, Serial No. 162,693

7 Claims. (Cl. 23—277)

This invention relates to an improved apparatus or retort useful in the manufacture of carbon bisulfide. Carbon bisulfide is commonly produced by the reaction of carbon and sulfur; the term "carbon" is employed generically herein as referring to any solid carbon source suitable for reaction with sulfur such as charcoal, coke, coal or other carbon, as is mentioned in U. S. Patent 2,036,840, or a specially prepared carbon such as that of U. S. Patent 1,709,611.

The reaction is usually conducted in a vertical tubular shell or retort, the sulfur being introduced as a liquid at the bottom of the shell, while the carbon is fed in at the upper end of the vertical shell to maintain the vessel substantially completely filled from the bottom to the top. The retort shell is heated by an externally fired furnace to raise the temperature of the carbon and sulfur present in the retort to that temperature whereat carbon bisulfide is formed; an apparatus typical of that employed is shown in United States Patent No. 321,661. Such retorts are subject to numerous failings and objections. For example, the overall thermal efficiency is relatively low inasmuch as the heat input to the carbon mass and the sulfur is through the wall of the retort and the mass of relatively non-conductive carbon filling the retort; the temperature of the furnace must, therefore, be considerably higher than that required for the reaction. As a result, the necessity of utilizing considerable excess fuel is inherent in the operation. Also, the life of the retort is relatively short, the inorganic salts, ash-forming constituents, carbon and sulfur forming incrustations or clinkers on the metal sidewalls of the retort. These have two objectionable effects: They result in a reduction in the rate of heat transmission through the retort wall and so raise its temperature to one higher than that required for the reaction and whereat the attack on the metal is accelerated. They apparently have a deleterious effect on the metal as such for reasons which are not fully apparent. For these reasons, it is usual to replace present retorts after a period of operation which is so short relatively that the period is measured in months. This relatively short retort life is due to the fact that the reaction between solid carbon and sulfur is exothermic and in a conventional retort temperatures may be locally present which are several hundred degrees higher than the furnace temperature and which are of the order of 1100° C. For example, I have actually measured localized reaction temperatures of carbon and sulfur at 1110° C. and which exceeded the furnace temperature by 200° C. At such an elevated temperature, sulfur will attack the metal retort shell much more rapidly than at 800°–900° C., the temperature necessary to initiate the $CS_2$ reaction.

Because the conventional furnace is filled with charcoal (a poor conductor), the rate of heat transfer to the mass of charcoal and to the sulfur passing through the charcoal is relatively poor, with the result that the production rate per unit of retort capacity is relatively low; sulfur traversing the central core of charcoal in the retort may even pass through without ever attaining reaction temperature. Also, due to the ash and carbon which attach themselves to the retort wall over the life of the retort, the heating rate falls off materially as the retort ages with an attendant reduction in production of carbon bisulfide.

In accordance with the present invention, there is provided a relatively simple retort for the reaction of solid carbon and sulfur which is effective to heat all the sulfur in the absence of carbon to a uniform temperature for subsequent contact and reaction with carbon in a separate zone in the retort which is isolated from the sulfur heating zone. Such a retort is conveniently provided by a functionally unitary tubular vessel adapted to be positioned vertically in a suitable furnace; means are provided for feeding sulfur as a liquid or vapor at the bottom of the shell and for introducing solid carbon particles into an upper portion of the shell. Intermediate the ends of the shell is provided a support upon which the charge of carbon rests in spaced relation to the lower portion of the shell so that the space below the charge support is free of carbon and serves only as a superheater for the sulfur. Thus, the support divides the unitary, tubular vessel into two separate functional units, a reaction zone which is filled with carbon and a heating zone wherein the sulfur is heated to reaction temperature or nearly so. The reaction zone is preferably so provided that the heat of reaction can be conserved and used to heat the carbon and sulfur to a substantially higher temperature to achieve a maximum rate of reaction.

To simplify heat insulation problems, it is preferred that the region wherein the reaction occurs be within the furnace proper, although no heat input is required to the reaction zone; such positioning of the reaction zone is not necessary and the actual reaction zone can be outside the furnace, providing it is suitably heat insulated so that the reaction proceeds without heat loss to the atmosphere, utilization being made of the superheat imparted to the sulfur vapor and of the heat liberated upon the reaction between carbon and the sulfur to increase its reaction rate.

The support means for the carbon charge is such that, when it is desired to clean the reaction space in the shell, the carbon and ash remaining on the support means can be released into the lower region of the retort from which they can be readily removed. Since the carbon charge is relatively small and is of materially reduced extent with respect to the charge present in the usual retort, it should be obvious that the hazard of loss of charcoal is materially reduced as is the time required for cleaning. When the reaction zone is clean, the carbon support is replaced and a fresh carbon charge placed in the reaction zone.

Such a retort as I have broadly described possesses many advantages as compared to those which have been heretofore employed or proposed. For example, the sulfur is heated by radiation, convection and conduction in an unobstructed space defined by a furnace heated wall, the sulfur temperature can be controlled at a definite level by regulating the furnace temperature. When the sulfur is brought into contact with the carbon, it is at reaction temperature and further heat addition is unnecessary; therefore, the reaction zone can be defined by any one of the materials which are resistant to attack by the reactants. Since heat input to the reaction zone is not necessary, one can use various non-metallic materials which are corrosion resistant but which are poor heat conductors. In fact, it is preferred to operate the reaction zone without heat loss so insulation of the reaction zone is desirable to insure that the heat liberated in the reaction is employed to heat the carbon and sulfur and promote the reaction at temperatures of the order of 1100° C.

It is in general the broad object of the present invention to provide an improved retort for the manufacture of carbon bisulfide.

Another object of the present invention is to provide an improved carbon bisulfide retort in which the sulfur is heated separately to reaction temperature in the retort and is then passed to the carbon to react therewith.

The invention includes other objects and features of advantage, some of which, together with the foregoing, will appear hereinafter wherein the present preferred form of carbon bisulfide retort of this invention is disclosed.

In the drawing accompanying and forming a part hereof,

Figure 1 is a side elevation partly in section, showing a retort in position in a furnace, the latter being shown schematically to simplify illustration.

Figure 2 is a section taken along line 2—2 of Figure 1.

Figure 3 is a section taken transversely of a modified form of retort and showing another form of support for the charcoal charge.

Figure 4 is a section taken along the line 4—4 of Figure 3.

Figure 5 is a side elevation partly in section through a modified form of retort embodying the invention.

Figures 6 and 7 are respectively sections taken through the device shown in Figure 5 along the line 6—6 and line 7—7, each view being on a reduced scale for convenience in illustration.

Referring to the drawing, and particularly to Figures 1 and 2, the installation includes a suitable furnace structure 6 supplied with heat from a suitable source (not shown). Retort 7 is supported in the furnace 6 and comprises a tubular shell 8 having a bottom closure 9 thereon, the latter usually resting upon the bottom of the furnace. The retort is made of any suitable material as cast iron, and is fabricated in any desired manner and of any desired number of parts or sections to provide a functionally unitary shell structure. A sulfur inlet 10 is provided in the lower portion of the shell 8 through which sulfur is admitted and ash is removed periodically; a suitable boot 11 is connected to the sulfur inlet and extends to the outside of the furnace to permit of feeding of sulfur as liquid or vapor and removal of ash and unused carbon from the bottom of the furnace during cleaning of the reaction zone.

Intermediate the ends of the shell 8 are provided a plurality of radial extensions 14, extending inwardly of the shell and spaced about the periphery of the shell. Each extension 14 includes a vertical riser portion 16 of smaller extent, the latter acting as a quid, as will presently appear, for a carbon charge support generally indicated at 17. This support includes an annulus 18 having a central cap 19 and an outer annular sulfur vapor deflector and carbon support 21 secured to the annulus 18. A rod 22 is secured to the cap 19 to lower the cap into place and to raise it to permit ash and carbon to drop into the sulfur heating zone. Deflector 21 includes several slots 24 in that portion of the deflector which rests on annulus 18 to permit sulfur vapor to pass freely into the supported carbon charge. Annulus 18 is supported on the four extensions 14 in spaced relation to the furnace sidewall by vertical guides 16.

An end bell structure 26 (Figures 1–5) rests upon the flange 12 of the retort shell and is provided with a carbon bisulfide outlet 27 and a carbon charge inlet 28 closed by a suitable means (not shown) such as a star-feeder or a suitable removable closure plate, as is shown in Figure 5.

It will be observed that the carbon charge support divides the retort generally into two zones, a reaction zone and a sulfur heating zone. The reaction zone space is of relatively small extent since at the higher temperatures achievable through concentration and conservation of exothermic heat of reaction, substantially shorter contact times and higher space velocities are sufficient to obtain the desired percentage conversion. One can feed the carbon continuously or intermittently so long as an adequate charge is present for reaction with the sulfur at any instant.

The sulfur heating zone should be sufficient to supply sulfur vapor at reaction temperature directly to the reaction zone. In any given retort, one can determine, for a given furnace temperature, the maximum permissible sulfur feed rate, since if this be exceeded, sulfur appears in an undue quantity in the exit gas and the carbon bisulfide production rate will decrease.

By having the sulfur heating section feeding superheated sulfur directly and immediately to the reaction zone, one avoids any heat loss from the sulfur, as inevitably would occur if superheating and reacting vessels were employed, connected by a conduit. Further, and what is more important, I have found that the superheated sulfur does not give rise to any corrosion problem in the superheating zone in the absence of charcoal or ash. Thus, I am able to employ cast iron retorts successfully to produce more carbon bisulfide per unit of retort volume and, at the same time, increase materially the useful retort life. The sulfur superheating section should have such an area and configuration that, for a given effective furnace temperature, the sulfur is raised to reaction temperature. Thus, if the sulfur be admitted as a vapor at 450° C., then it is necessary to raise it some 350° C., to 800° C. Heat transmission to the sulfur vapor in the retort can be improved by utilizing fins, baffles or other internal surface which will absorb radiant heat and provide additional heated surface for contact with sulfur vapor in the sulfur heating section of the retort.

In operation, sulfur is introduced into the sulfur inlet 10, preferably as a vapor; the vapor rises through the lower portion of the retort and thence into the carbon charge in the reaction zone. With the furnace operating at a temperature of between about 800° and 950° C., and with the sulfur feed rate commensurate with the size of the apparatus, it will be found that the sulfur entering the carbon charge is at reaction temperature, e. g. greater than 750° C., one whereat the reaction between the carbon and sulfur goes on exothermically.

When ash has accumulated in the reaction zone to an undesirable extent, the inlet 28 is exposed and rod 22 is raised to remove cap 19 from the annulus 18. The ash then drops into the sulfur heating zone from which it is readily removed through the sulfur feed inlet. The cap 19 is then lowered into position and a fresh carbon charge inserted. The retort is then ready for further operation.

In Figures 3 and 4, I have shown a modified form of retort in which carbon charge support 17, the carbon charge and the reaction zone are outside the furnace. To avoid heat loss from the reaction zone, the exterior of the furnace is additionaly covered with heat insulation 41 to insure retention of the heat of reaction. In this form of retort, the carbon charge is supported on two plates 42 of semi-circular outline resting on radial extensions 14 and retained in position by guides 16 engaging notches 43 in plates 42. The plates are apertured as at 44 and frangible supports 46 (bricks, tiles or other frangible elements) are positioned over the aperture 44 to support the carbon charge; cap 19 can be made of a frangible material in that retort shown in Figures 1 and 2.

When ash has accumulated and it is desired to clean the reaction zone, a poker-rod is lowered and the frangible aperture closure 46 is broken to permit the ash and broken fragments to drop into the sulfur heating zone for removal. A new frangible closure is then placed in position. A new carbon charge is then placed and operation resumed by feeding carbon and sulfur.

The space above the charcoal charge support is shown as including a refractory lining 33. Such a lining is desirable to protect the metal shell in the reaction zone in either retort against corrosion, for example, by the hot sulfur vapor and by various inorganic salts or other materials present in the carbon source or added to the carbon source to improve the rate of reaction, as is suggested in U. S. Patent 2,026,840. Only the reaction zone proper need be lined with a suitable refractory to protect the metal shell. Since heat is not transferred through the shell wall in the region of the reaction zone, adequate protection against corrosion can be given in this region by employing a dense refractory, for example, which is highly resistant to each of the various corrosive materials present.

In that form of retort shown in Figures 5 and 6, the retort is provided with a plurality of lugs 61 at an elevation in the tubular shell 8 just above the sulfur inlet. Supported upon the lugs is a tubular shell 62 having several inwardly extending arms 63 formed thereon to rest upon each of the lugs 61. The shell 62 and the shell 8 are preferably cylindrical in shape and concentrically positioned to provide a sulfur passage of uniform sectional size through which the sulfur ascends. The tubular shell 62 is provided with a conical upper end 66. The shell 62 acts as a black body or heat radiator in the upper portion of the tubular shell 8, to heat the sulfur passing between it and the shell 8 by radiation whereby the sulfur is raised quickly to a reaction temperature.

The upper portion of the shell 8 and end bell structure 26 includes suitable refractory linings such as are indicated at 71 and 72; that at 72 is particularly designed to be resistant to the carbon-sulfur reaction because reaction occurs in this region, that is where the hot sulfur comes into contact with the carbon mass. Bell 26 is preferably provided with a flange 73 at its upper end from which a tubular member 74 depends in a spaced relation to the heat refracting lining 71 to provide a passage to outlet 27 so that the carbon in the tubular member is out of the path of the reaction products. Carbon is added through opening 76 upon raising of cover 77 with lever 78.

This is a continuation-in-part of my application Serial No. 40,512 filed July 24, 1948, now abandoned.

I claim:

1. Apparatus for the manufacture of carbon bisulfide comprising a furnace; an elongated tubular shell standing vertically in said furnace and having a first inlet for feeding sulfur into a lower portion of the vertical shell and a second inlet for feeding carbon into an upper portion of the vertical shell; radical abutments intermediate the ends of the shell; and support means resting on said abutments and extending transversely of the shell and providing a support for carbon fed into the shell through said second inlet, said support means dividing the shell into an upper reaction zone wherein carbon and sulfur react and a lower zone wherein sulfur admitted to the lower portion of the zone is heated to a temperature whereat the sulfur reacts with the carbon to form carbon bisulfide; a tubular vessel provided in said elongated tubular shell below said support means and in a spaced relation to at least a portion of said elongated tubular shell to provide a passageway for sulfur between a portion of the inner surface of said shell and the outer surface of said vessel, said tubular vessel having a closed conical top; an outlet from said shell for products of reaction, said outlet being from said upper reaction zone and communicating with the upper portion of said shell above said support means; said shell being positioned in said furnace with at least that portion of the shell defining the sulfur heating zone confined within and receiving heat from the furnace.

2. Apparatus for the manufacture of carbon bisulfide comprising a furnace, an elongated tubular shell standing vertically in said furnace and having a first inlet for feeding sulfur into a lower portion of the vertical shell and a second inlet for feeding carbon into an upper portion of the vertical shell; radical abutments intermediate the ends of the shell; support means resting on said abutments and extending transversely of the shell and providing a support for carbon fed into the shell through said second inlet, said support means dividing the shell into an upper reaction zone wherein carbon and sulfur react and a lower zone wherein sulfur admitted to the lower portion of the zone is heated by the furnace to a temperature whereat sulfur reacts with carbon to form carbon bisulfide; an elongated tubular vessel mounted in said tubular shell below said support means and spaced therefrom to provide a substantially uniform sulfur passage between said vessel and said shell, said tubular vessel having a closed conical top; an outlet from said shell for products of reaction, said outlet being from said upper reaction zone and communicating with the upper portion of said shell above said support means; said shell being positioned in said furnace with at least that portion of the shell defining the sulfur heating zone confined within and receiving heat from the furnace; and a refractory lining in said shell in that portion of the shell providing said reaction zone.

3. Apparatus for the manufacture of carbon bisulfide comprising a furnace; an elongated tubular shell standing vertically in said furnace and having a first inlet for feeding sulfur into a lower portion of the vertical shell and a second inlet for feeding carbon into an upper portion of the vertical shell; radial abutments intermediate the ends of the shell; an elongated tubular vessel mounted in said tubular shell and spaced therefrom to provide a substantially uniform sulfur passage between said vessel and said shell, said tubular vessel having a closed conical top; and support means extending transversely of the shell over said tubular vessel and supported on said abutments and providing a support for carbon fed into the shell through said second inlet, said support means dividing the shell into an upper reaction zone wherein carbon and sulfur react and a lower zone wherein sulfur admitted to the lower portion of the zone is heated by said furnace to a temperature whereat the sulfur reacts with the carbon to form carbon bisulfide; a tubular deflector plate mounted above the support means on the vessel to deflect carbon from the passage between the vessel and the shell; an outlet from said shell for products of reaction, said outlet being from said upper reaction zone and communicating with the upper portion of said shell above said support means; said shell being positioned in said furnace with that portion of the shell defining the sulfur heating zone and at least a portion of the reaction zone confined within and receiving heat from the furnace.

4. Apparatus for the manufacture of carbon bisulfide comprising a furnace, an elongated tubular shell standing vertically in said furnace, a first inlet for feeding sulfur into a lower portion of the vertical shell, a second inlet for feeding solid carbon particles into an upper portion of the vertical shell to provide a mass of carbon particles therein, an outlet from the upper portion of the shell for products of reaction; radial abutments intermediate the ends of the shell, and support means resting on said abutments and extending transversely of the shell to divide the shell into an upper reaction zone containing said mass of carbon particles and wherein sulfur vapor and carbon react to form $CS_2$ and leave a solid ash residue and a lower zone which is heated by the furnace and wherein sulfur admitted through said first inlet is heated to a temperature whereat the sulfur vapor is reactive with carbon to form carbon bisulfide; said support means including a first carbon mass support including an annular grating shelf extending inwardly and transversely of the shell to provide a partial support for the carbon mass and to admit sulfur vapor into said upper reaction zone and having an opening therein through which the mass of carbon particles and ash residue in the reaction zone can fall freely into the lower zone, and a second carbon support including a temporary closure member mounted upon the grating shelf of the first carbon support over said opening normally to close said opening sufficiently to retain said mass of carbon particles and ash residue in the upper zone, said second carbon support being movable to permit unreacted carbon and the ash residue to pass freely into the lower zone for removal from the tubular shell.

5. Apparatus for the manufacture of carbon bisulfide comprising a furnace, an elongated tubular shell standing vertically in said furnace, a first inlet for feeding sulfur into a lower portion of the vertical shell, a second inlet for feeding solid carbon particles into an upper portion of the vertical shell to provide a mass of carbon particles therein, an outlet from the upper portion of the shell for products of reaction, radial abutments intermediate the ends of the shell, and support means resting on said abutments and extending transversely of the shell to divide the shell into an upper reaction zone containing said mass of carbon particles and wherein sulfur vapor and carbon react to form $CS_2$ and leave a solid ash residue and a lower zone which is heated by the furnace and wherein sulfur admitted through said first inlet is heated to a temperature whereat the sulfur vapor is reactive with carbon to form carbon bisulfide; said support means including a first carbon mass support including an annular grating shelf extending inwardly and transversely of the shell to provide a partial support for the carbon mass and having a plurality of openings therein to admit sulfur vapor into said upper reaction zone and through one of which openings the mass of carbon particles and ash residue in the reaction zone can fall freely into the lower zone, and a second carbon support including a temporary closure member mounted upon the grating shelf of the first carbon support over said one opening normally to close said one opening and retain said mass of carbon particles in the upper zone and ash residue, said second carbon support being movable to drop unreacted carbon and the ash residue to pass freely into the lower zone for removal from the tubular shell.

6. Apparatus for the manufacture of carbon bisulfide comprising a furnace, an elongated tubular shell standing vertically in said furnace, a first inlet for feeding sulfur into a lower portion of the vertical shell in said furnace, a second inlet for feeding solid carbon particles into an upper portion of the vertical shell above said furnace to provide a mass of carbon particles therein, an outlet from the upper portion of the shell for products of reaction, radial abutments intermediate the ends of the shell, and support means resting on said abutments and extending transversely of the shell at an elevation to divide the shell into an upper reaction zone containing said mass of carbon particles and wherein sulfur and carbon react to form carbon bisulfide and leave an ash residue and a lower zone wherein sulfur admitted through said first inlet is heated as a vapor by said furnace to a temperature whereat the sulfur vapor is reactive with carbon to form carbon bisulfide; said support means including carbon mass support including an annular grating shelf extending transversely of the shelf and having an opening therein through which the mass of carbon particles and any ash residue can pass to the lower zone, and at least one frangible support positioned on the grating shelf of said carbon mass support and extending across said opening normally to restrict said opening sufficiently to retain the mass of carbon particles and the ash residue in the upper zone and admit freely sulfur from the lower zone into contact with the mass of carbon in the upper zone, said frangible support being adapted to be broken with a poker extended down through said reaction zone to release the carbon charge and ash residue into the lower portion of the furnace for removal therefrom.

7. Apparatus for the manufacture of carbon bisulfide comprising a furnace, an elongated tubular shell standing vertically in said furnace to receive heat therefrom in a lower portion, a first inlet for feeding sulfur into a lower portion of the vertical shell, a second inlet for feeding solid carbon particles into an upper portion of the vertical shell to provide a mass of carbon particles therein, an outlet from the upper portion of the shell for products of reaction, radial abutments intermediate the ends of the shell, and support means resting on said abutments and extending transversely of the shell at an elevation to divide the shell into an upper reaction zone containing said mass of carbon particles and wherein sulfur and carbon react to form carbon bisulfide and leave an ash residue and a lower zone wherein sulfur admitted through said first inlet is heated as a vapor to a temperature whereat the sulfur vapor is reactive with carbon to form carbon bisulfide; said support means including carbon mass support including an annular grating shelf extending transversely of the shell and having an opening therein through which sulfur can pass from the lower zone and through which the mass of carbon particles and any ash residue can pass to the lower zone, and a plurality of frangible supports positioned on the grating shelf of said carbon mass support and extending across said opening in a spaced relation to one another and to the opening in said support normally to restrict said opening sufficiently to retain the mass of carbon particles in the upper zone and admit freely sulfur from the lower zone into contact with the mass of carbon in the upper zone, said frangible supports being adapted to be broken with a poker extended down through said reaction zone to release the carbon charge and ash residue into the lower portion of the furnace for removal therefrom.

IVER C. MACDOUGALL.

REFERENCES CITED

The following references are of record in the file of this patent:

UNITED STATES PATENTS

| Number | Name | Date |
|---|---|---|
| 321,661 | Taylor | July 7, 1884 |
| 605,812 | Blackmore | June 14, 1898 |
| 1,218,588 | Barnett | Mar. 6, 1917 |
| 1,705,614 | Griswold | Mar. 19, 1929 |
| 1,904,513 | Nordlander | Apr. 18, 1933 |
| 2,052,297 | Iddings | Aug. 25, 1936 |